United States Patent
Varughese et al.

(10) Patent No.: US 11,710,975 B2
(45) Date of Patent: Jul. 25, 2023

(54) BATTERY CHARGING SYSTEMS AND METHODS

(71) Applicant: DENSO International America, Inc., Southfield, MI (US)

(72) Inventors: Sibu Varughese, Sterling Heights, MI (US); Martin Nespolo, Grosse Pointe Woods, MI (US); Gareth Webb, New Hudson, MI (US); Thomas Krzyzak, Livonia, MI (US); Wilson Yim, Troy, MI (US); Matthew Johnson, Royal Oak, MI (US)

(73) Assignee: DENSO International America, Inc., Southfield, MI (US)

( * ) Notice: Subject to any disclaimer, the term of this patent is extended or adjusted under 35 U.S.C. 154(b) by 322 days.

(21) Appl. No.: 16/942,889

(22) Filed: Jul. 30, 2020

(65) Prior Publication Data
US 2022/0032777 A1     Feb. 3, 2022

(51) Int. Cl.
*H02J 7/00*      (2006.01)
*B60L 53/62*      (2019.01)
*B60L 1/00*      (2006.01)
*H02J 7/14*      (2006.01)

(52) U.S. Cl.
CPC .............. *H02J 7/007* (2013.01); *B60L 53/62* (2019.02); *H02J 7/0024* (2013.01); *B60L 1/006* (2013.01); *H02J 7/1423* (2013.01); *Y02T 10/7072* (2013.01)

(58) Field of Classification Search
CPC ........ H02J 7/0024; H02J 7/007; H02J 7/1423; B60L 53/62; B60L 1/006; Y02T 10/7072

USPC .......................... 320/104, 119, 121, 122, 163
See application file for complete search history.

(56) References Cited

U.S. PATENT DOCUMENTS

| | | |
|---|---|---|
| 9,688,247 B1 | 6/2017 | Jayaraman et al. |
| 9,794,753 B1 | 10/2017 | Stitt et al. |
| 9,894,492 B1 | 2/2018 | Elangovan et al. |
| 10,002,479 B2 | 6/2018 | Oz et al. |
| 10,244,476 B2 | 3/2019 | Elangovan et al. |
| 10,328,898 B2 | 6/2019 | Golsch et al. |
| 10,328,899 B2 | 6/2019 | Golsch |
| 10,328,900 B1 | 6/2019 | Yakovenko et al. |
| 2011/0215921 A1 | 9/2011 | Ben Ayed et al. |

(Continued)

FOREIGN PATENT DOCUMENTS

| | | |
|---|---|---|
| BR | 102014017465 A2 | 2/2016 |
| CN | 104574593 A | 4/2015 |

(Continued)

*Primary Examiner* — Edward Tso
*Assistant Examiner* — Aaron Piggush
(74) *Attorney, Agent, or Firm* — Harness, Dickey & Pierce, P.L.C.

(57) ABSTRACT

A battery charging system of an electronic device includes: a battery having a first nominal voltage and including: battery cells each having a second nominal voltage that is less than the first nominal voltage; and electrical connectors that electrically connect ones of the battery cells to provide the battery with the first nominal voltage; a first charge port configured to electrically connect to a first type of connector; a charging module configured to: receive power via the first charge port; and when a voltage of the received power is less than the first nominal voltage at least one of: charge ones of the battery cells individually; and charge groups of two or more of the battery cells.

16 Claims, 13 Drawing Sheets

(56) References Cited

U.S. PATENT DOCUMENTS

Figure 1:
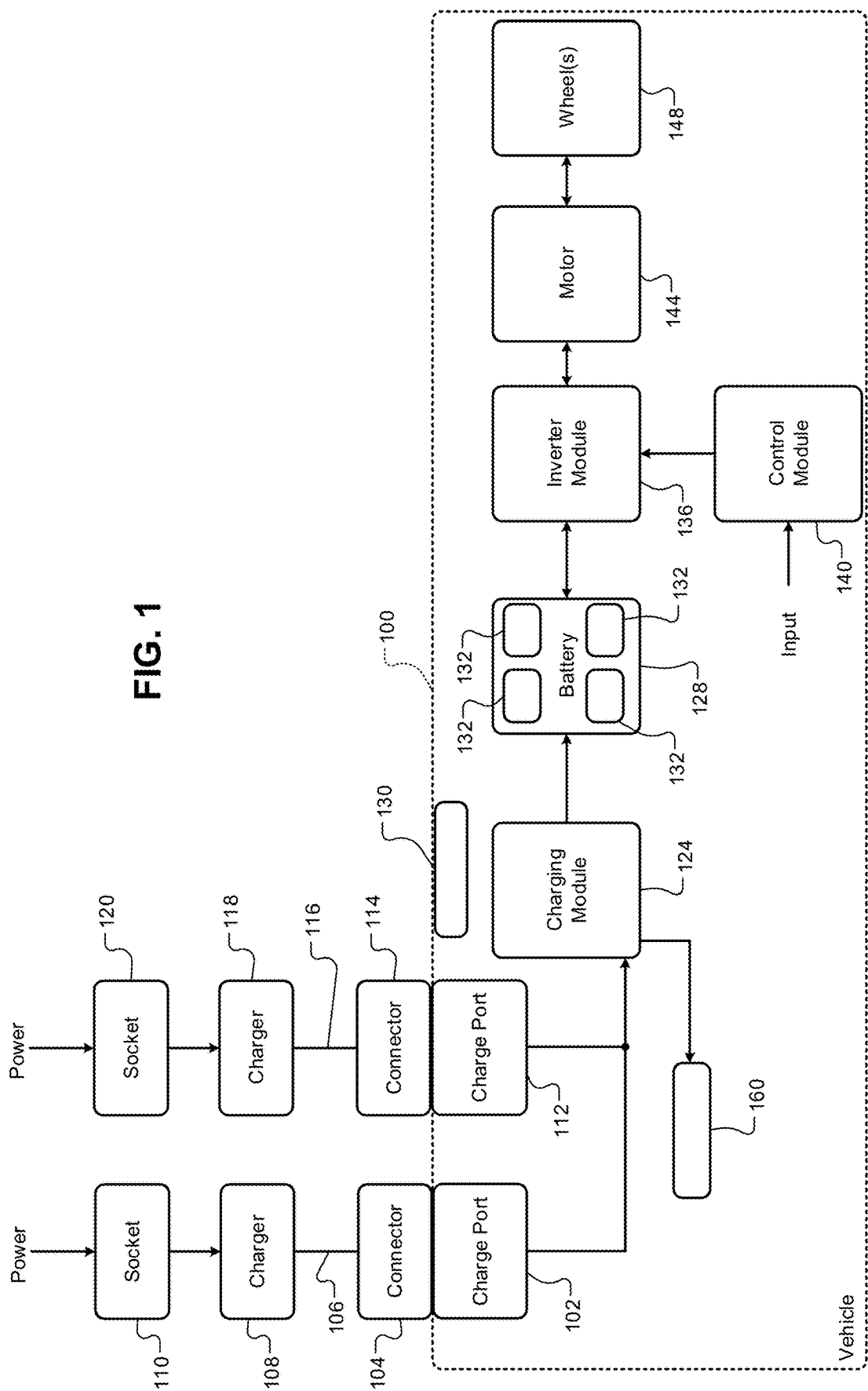

| | | | |
|---|---|---|---|
| 2012/0045058 A1 | 2/2012 | Weghaus | |
| 2012/0256568 A1* | 10/2012 | Lee | B60L 7/26 |
| | | | 429/150 |
| 2013/0234667 A1* | 9/2013 | Norton | H02J 7/0016 |
| | | | 320/122 |
| 2014/0266051 A1* | 9/2014 | Hayakawa | H02J 7/0019 |
| | | | 320/118 |
| 2014/0274013 A1 | 9/2014 | Santavicca | |
| 2015/0048796 A1* | 2/2015 | Sherstyuk | H01M 10/425 |
| | | | 320/129 |
| 2015/0148989 A1 | 5/2015 | Cooper et al. | |
| 2015/0161832 A1 | 6/2015 | Esselink et al. | |
| 2015/0310681 A1 | 10/2015 | Avery et al. | |
| 2015/0356797 A1 | 12/2015 | McBride et al. | |
| 2016/0150407 A1 | 5/2016 | Michaud et al. | |
| 2017/0062938 A1 | 3/2017 | Cheng et al. | |
| 2017/0104589 A1 | 4/2017 | Lambert et al. | |
| 2017/0132533 A1 | 5/2017 | Darnell et al. | |
| 2017/0309098 A1 | 10/2017 | Watters et al. | |
| 2017/0330402 A1 | 11/2017 | Menard et al. | |
| 2018/0029560 A1 | 2/2018 | Mohaupt et al. | |
| 2018/0099643 A1 | 4/2018 | Golsch et al. | |
| 2018/0103414 A1 | 4/2018 | Golsch | |
| 2018/0126952 A1 | 5/2018 | Niemiec | |
| 2018/0154865 A1 | 6/2018 | Bianchi, III et al. | |
| 2018/0269565 A1 | 9/2018 | Guthrie et al. | |

FOREIGN PATENT DOCUMENTS

| | | |
|---|---|---|
| WO | WO-16156682 A1 | 10/2016 |
| WO | WO-2017181050 A1 | 10/2017 |
| WO | WO-18040641 A1 | 3/2018 |

\* cited by examiner

Series

Parallel

24 Volt Batteries

Series/
Parallel

BATTERY CHARGING SYSTEMS AND METHODS

FIELD

The present disclosure relates to batteries and more particularly to systems and methods for charging batteries, such as batteries of vehicles.

BACKGROUND

This section provides background information related to the present disclosure which is not necessarily prior art.

Various types of devices include one or more batteries. For example, mobile phones include a battery, tablet devices include a battery, portable (e.g., laptop) computers include a battery, etc. Other types of devices also include batteries. For example, electric vehicles also include a battery. Examples of electric vehicles include passenger vehicles, electric trucks, electric motorcycles, electric bicycles, and electric scooters.

The batteries of different types of devices may have different nominal voltages. For example, the nominal voltages of batteries of mobile phones may be less than the nominal voltages of tablet devices. The nominal voltages of batteries of portable computers may be greater than the nominal voltages of tablet devices. The nominal voltages of batteries of electric vehicles may be greater than the nominal voltages of mobile phones, tablet devices, and portable computers.

Devices include charge ports to receive power for battery recharging. Different types of devices may include different types of charge ports. Each type of charge port may be configured to receive power via a specific type of adapter.

SUMMARY

This section provides a general summary of the disclosure, and is not a comprehensive disclosure of its full scope or all of its features.

In a feature, a battery charging system of an electronic device includes: a battery having a first nominal voltage and including: battery cells each having a second nominal voltage that is less than the first nominal voltage; and electrical connectors that electrically connect ones of the battery cells to provide the battery with the first nominal voltage; a first charge port configured to electrically connect to a first type of connector; a charging module configured to: receive power via the first charge port; and when a voltage of the received power is less than the first nominal voltage at least one of: charge ones of the battery cells individually; and charge groups of two or more of the battery cells.

In further features, the charging module is configured to, when the voltage of the received power is less than the first nominal voltage, determine a number of the battery cells to charge at a time based on the voltage and the second nominal voltage.

In further features, the charging module is configured to set the number based on the voltage divided by the second nominal voltage.

In further features, the charging module is configured to round the number down to a nearest integer when the number is a non-integer.

In further features, the charging module is further configured to when the voltage is greater than or equal to the first nominal voltage, charge all of the battery cells concurrently.

In further features, a reconfiguration module has outputs connected to the battery cells individually, wherein the charging module is configured to actuate the reconfiguration module to charge the battery cells.

In further features, a reconfiguration module includes: a transformer per battery cell and a pair of switches per battery cell configured output power to at least one of: ones of the battery cells individually; and groups of two or more of the battery cells.

In further features, the first type of connector satisfies a universal serial bus (USB) standard.

In further features, a second charge port is configured to electrically connect to a second type of connector, where the charging module is further configured to receive power via the second charge port, and where the second type of connector does not satisfy any universal serial bus (USB) standard.

In further features: the first type of connector has a first maximum voltage; the second type of connector has a second maximum voltage; and the second maximum voltage is greater than the first maximum voltage.

In further features: a charger has a plug end configured to receive power via a wall outlet; and a charge cable is connected at a first end to the charger and connected at a second end to the second type of connector.

In further features: a charger has a plug end configured to receive power via a wall outlet; and a charge cable is connected at a first end to the charger and connected at a second end to a third type of connector that is different than the second type of connector; and an adaptor has a first end configured to electrically connect to the third type of connector and a second end having the second type of connector.

In further features, the vehicle is one of an electric bicycle and an electric scooter.

In a feature, a battery charging method for a vehicle includes: receiving power from (i) a first charge port configured to electrically connect to a first type of connector and (ii) a second charge port configured to electrically connect to a second type of connector that is different than the first type of connector; and when a voltage of the received power is less than a first nominal voltage of a battery one of: charging ones of battery cells of the battery individually; and charging groups of two or more of the battery cells of the battery, where the battery includes: the battery cells and the battery cells have a second nominal voltage that is less than the first nominal voltage; and electrical connectors that electrically connect ones of the battery cells to provide the battery with the first nominal voltage.

In further features, the battery charging method further includes: determining a number of the battery cells to charge at a time based on the voltage and the second nominal voltage; and when the voltage of the received power is less than the first nominal voltage of the battery, charging the determined number of the battery cells at a time.

In further features, the determining includes setting the number based on the voltage divided by the second nominal voltage.

In further features, the setting includes rounding the number down to a nearest integer when the number is a non-integer.

In further features, the battery charging method further includes, when the voltage is greater than or equal to the first nominal voltage, charging all of the battery cells concurrently.

In further features, the second type of connector satisfies a universal serial bus (USB) standard.

In further features, the first type of connector does not satisfy any universal serial bus (USB) standard.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
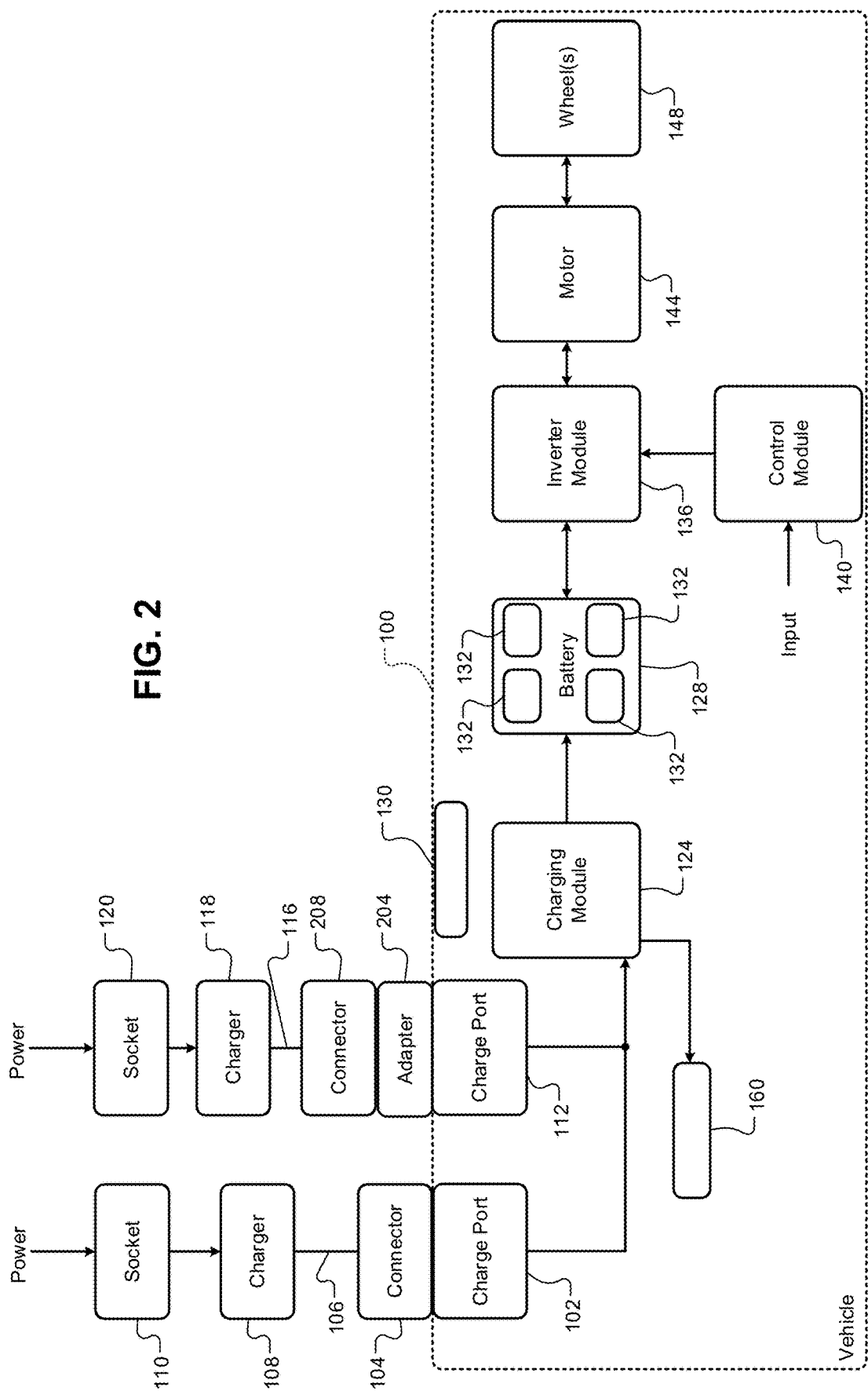

FIGS. 1 and 2 are functional block diagrams of an example vehicle system.

Figure 3:
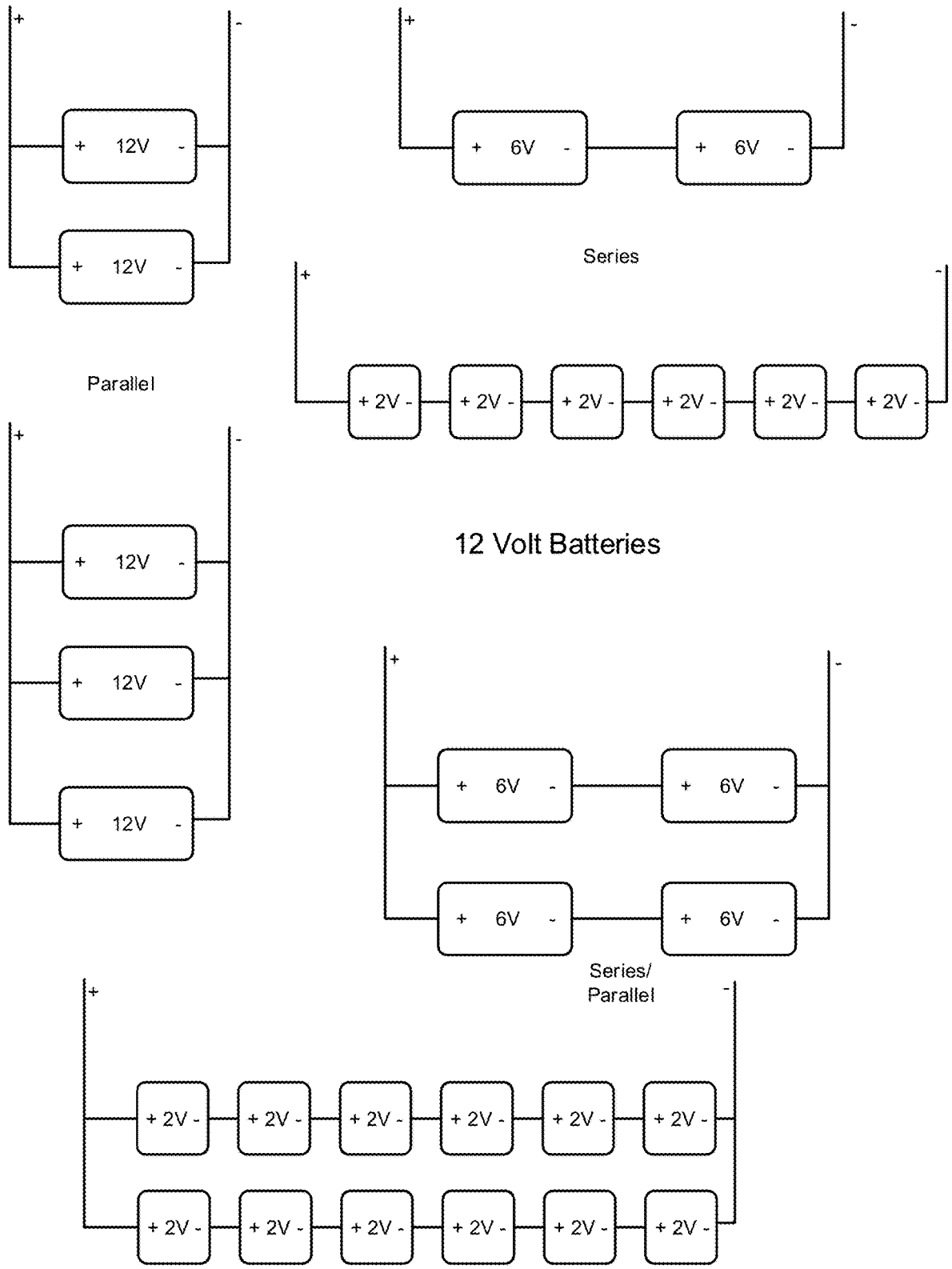
Figure 3:
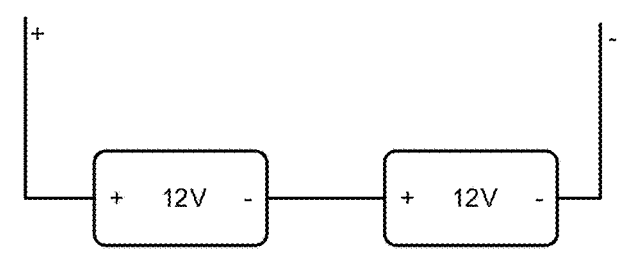
Figure 3:
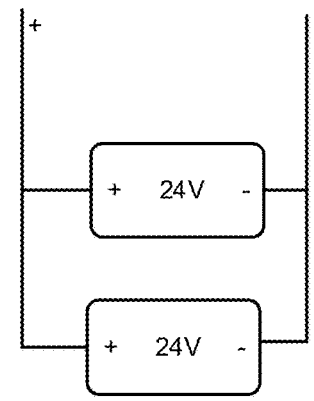
Figure 3:
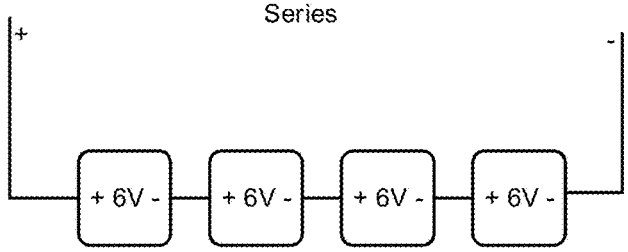
Figure 3:
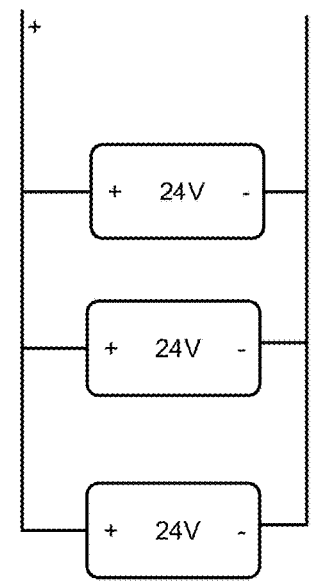
Figure 3:
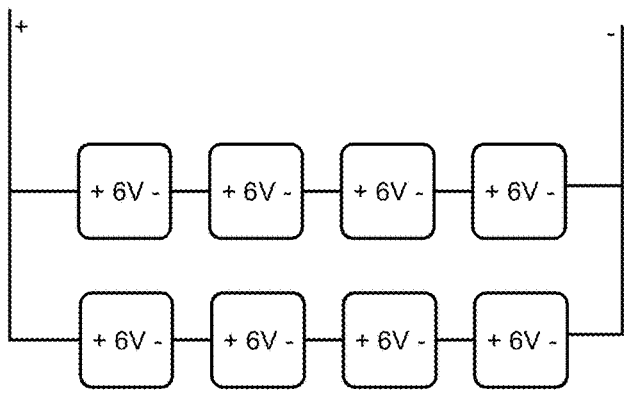
Figure 3:
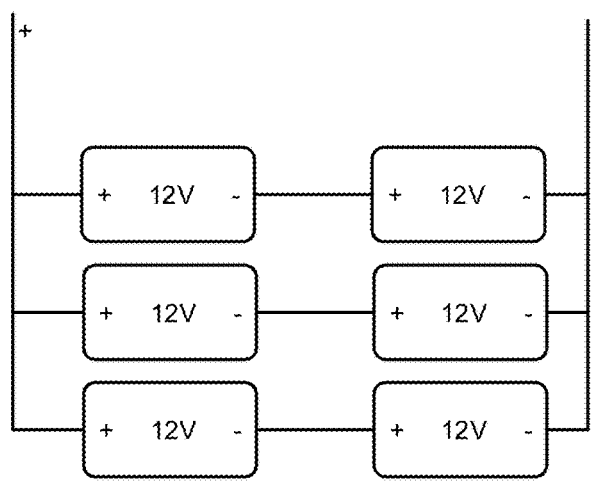
Figure 3:
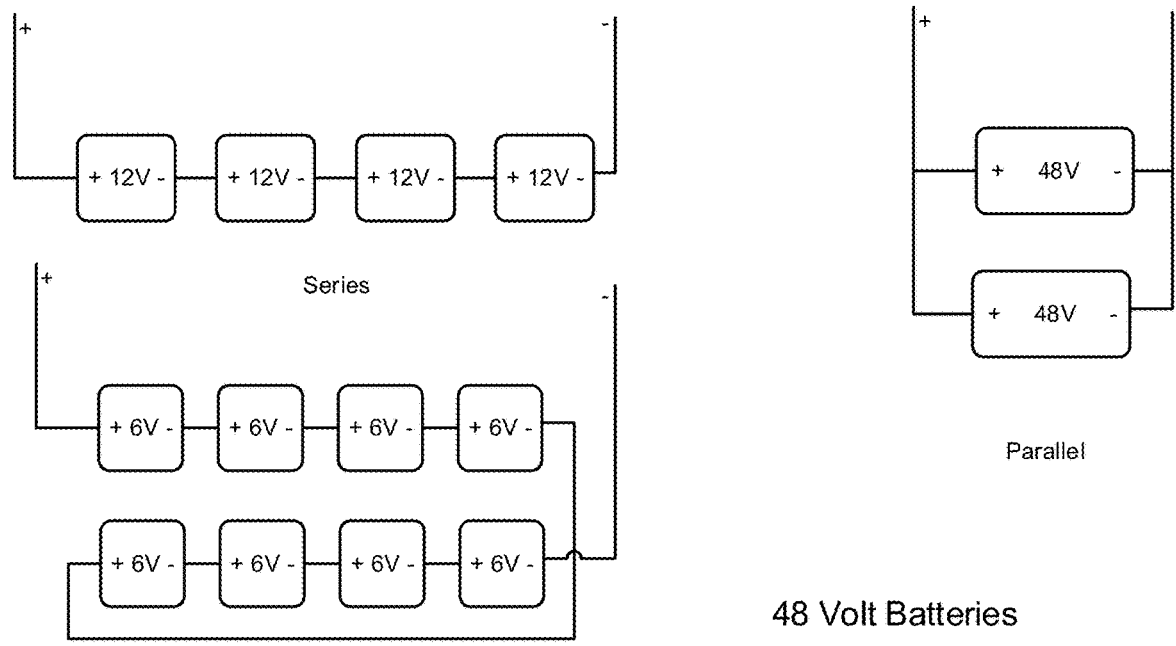
Figure 3:
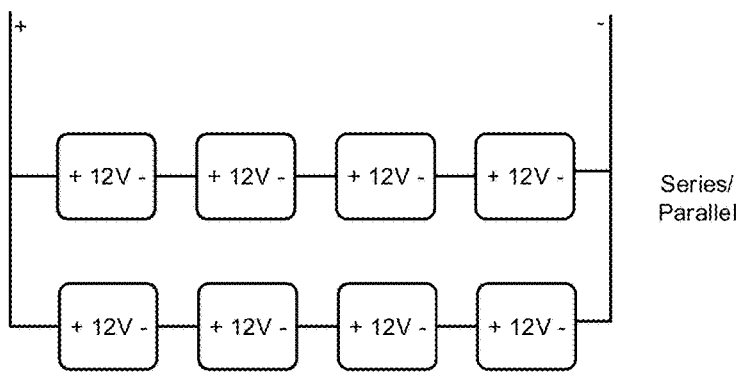

FIGS. 3A-3C include diagrams of example 12, 24, and 48 nominal voltage batteries with various different cell voltages and examples of how the cells can be electrically connected to achieve the 12, 24, or 48 nominal output voltage.

FIGS. 4-8 are functional block diagrams of an example battery charging system.

Figure 9:
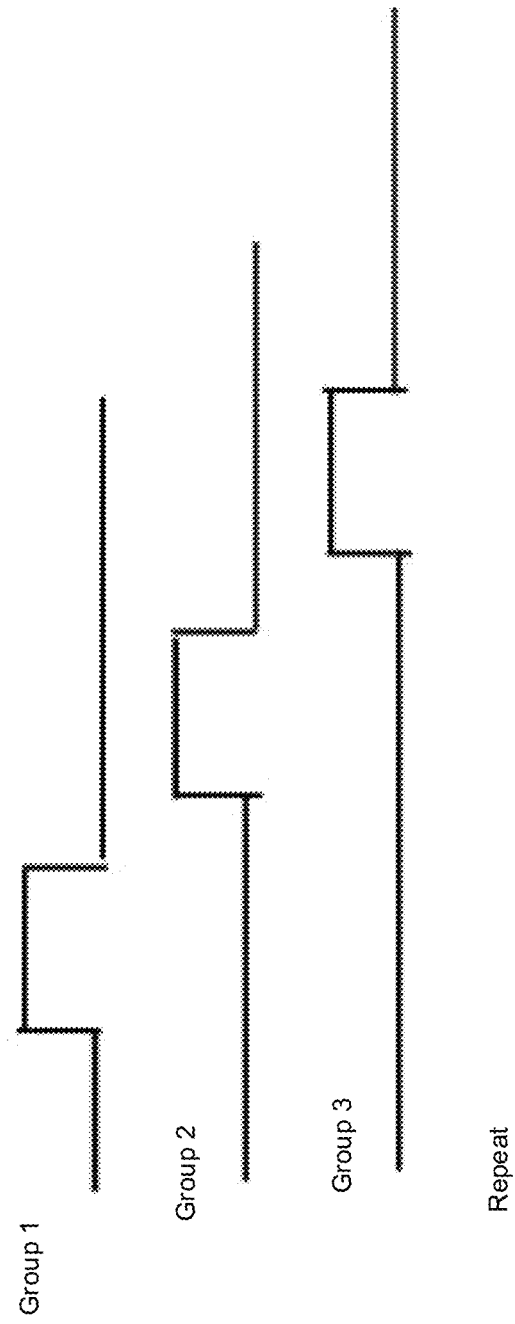

FIG. 9 includes an example graph of cycling charging of groups of battery cells.

Figure 10:
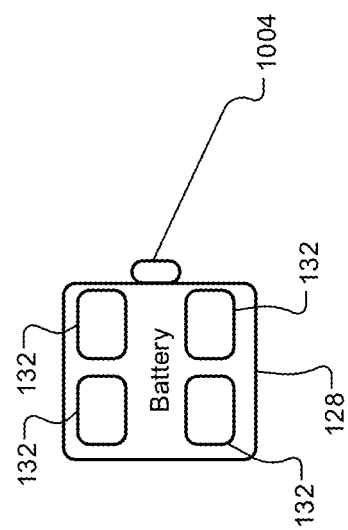

FIG. 10 includes a functional block diagram of an example implementation of the battery including an expansion port that can be connected to additional battery cells.

Figure 11:
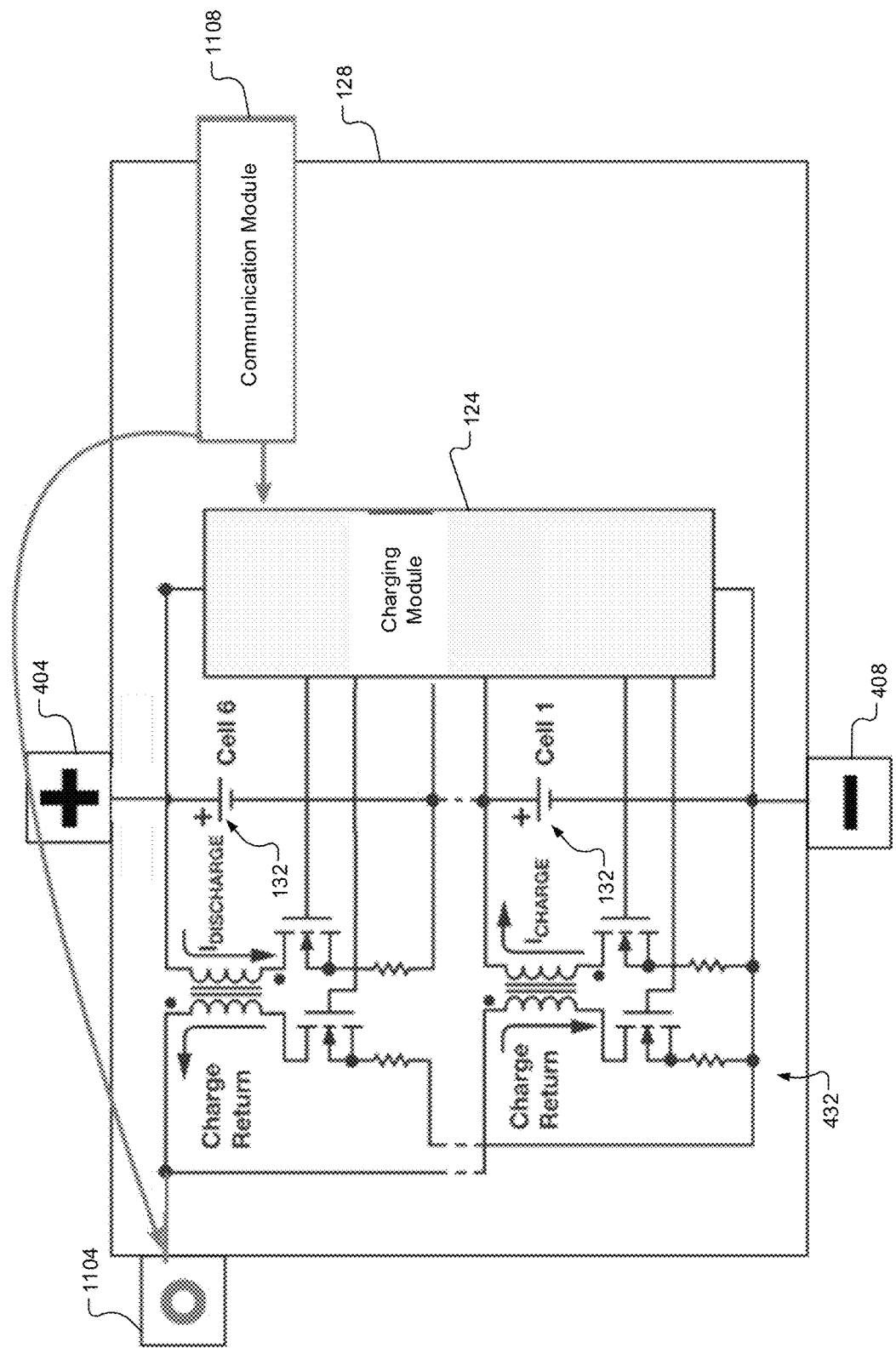

FIG. 11 includes a functional block diagram of an example implementation of the battery.

Corresponding reference numerals indicate corresponding parts throughout the several views of the drawings.

DETAILED DESCRIPTION

Example embodiments will now be described more fully with reference to the accompanying drawings.

A battery, such as a battery of a vehicle, includes a plurality of individual battery cells that are electrically connected within the battery such that the battery has a nominal output voltage. For example, a battery of an electric bike or scooter may include a plurality of 1 to 6 volt battery cells that are connected such that the battery has a nominal output voltage of 12 volts, 24 volts, 36 volts, 48 volts, etc. There is a need to be able to reconfigure a battery so that a battery charger with a lower nominal output voltage than the battery can be used to charge cells/modules of the battery in groups or individually.

The vehicle includes a first charge port configured to receive power via one type of input connector, such as a non-universal input connector (e.g., not satisfying any universal serial bus (USB) standard) of an original equipment manufacturer (OEM) charger of the vehicle. The vehicle may also include a second charge port configured to receive power via a universal connector, such as a USB-C type connector or another suitable type of universal connector. USB-C type connectors may be used to charge other types of devices, such as laptop computers, tablet devices, mobile phones, etc.

The voltage received via the first charge port may approximately equal to the nominal voltage of the battery such that power received via the first charge port can be used to charge all of the battery cells of the battery at the same time. The voltage received via the second charge port, however, may be less than the nominal voltage of the battery.

The present application involves a charging module configured to selectively charge battery cells or groups of battery cells (or battery modules) individually when voltage less than the nominal voltage of the battery is received, such as via the second charge port. The charging module charges the groups via connecting to the individual battery cells within the battery using a reconfiguration module (e.g., including a multiplexer). The charging module may rotate charging of the groups, for example, for charge balancing. This may allow the battery to be charged (via the individual groups) by a charger of another device (e.g., a laptop charger) via the universal connector, such as at times when the OEM charger is not available.

FIG. 1 is a functional block diagram of a portion of an example vehicle 100, such as an electric bicycle, an electric scooter, or an electric motorcycle. While the example of a vehicle is provided, the present application is also applicable to other types of electronic devices that include a battery, such as power tools, etc.

A first charge port 102 is configured to be electrically connected to a predetermined type of input connector 104. For example, the first charge port 102 may include male type connectors and the input conductor 104 may include female type connectors or vice versa. The input connector 104 may be a non-universal input connector and not satisfy any universal serial bus (USB) standard.

The input connector 104 is connected by wire 106 to a charger 108. In various implementations, the wire 106 may be fixed to the charger 108 or connectable and disconnectable to and from the charger 108. The charger 108 include a plug end (e.g., a male type plug end) configured to be electrically connected to a socket 110 (e.g., a female type socket) that receives power, such as 110 Volt (V) alternating current (AC) power, 220 V AC power, or power having other suitable characteristics. In various implementations, the charger 108 may be hard wired to receive power.

A second charge port 112 is configured to be electrically connected to a predetermined type of input connector 114. For example, the second charge port 112 may include male type connectors and the input connector 114 may include female type connectors or vice versa. The input connector 114 is a different type than the input connector 104, and the second charge port 112 is configured to receive a different type of input connector than the first charge port 102. The second charge port 112 is configured to receive a universal input connector, such as an input connector satisfying a USB standard, such as the USB-C standard. While the example of the USB-C standard is provided, the present application is also applicable to types of connectors, such as USB-A connectors, USB-B connectors, USB mini-A connectors, USB mini-B connectors, USB mini-AB connectors, lighting connectors by Apple, Inc, and other types of universal connectors. The second charge port 112 may be the same type of charge port as the first charge port 102. While the example of two charge ports is provided, more than two charge ports may be included.

As shown in FIG. 2, an adapter 204 may be used to connect an input connector 208 to the second charge port 112 if the input connector 208 is has a different configuration than the second charge port 112.

The second input connector 114 is connected by wire 116 to a charger 118. In various implementations, the wire 116 may be fixed to the charger 118 or connectable and disconnectable to and from the charger 118. The charger 118 include a plug end (e.g., a male type plug end) configured to be electrically connected to a socket 120 (e.g., a female type socket) that receives power, such as 110 volt (V) alternating current (AC) power, 220 V AC power, or power having other suitable characteristics.

A charging module 124 selectively charges a battery 128 using power received via the first charge port 102 or the second charge port 112. In various implementations, one or more devices 130 may be implemented to prevent receiving power from both of the first and second charge ports 102 and 112 simultaneously. The battery 128 may also be referred to as a battery module or a battery pack.

The battery 128 includes a nominal (output) voltage. For example, the battery 128 may have a 12 V direct current (DC) nominal voltage, a 24 V DC nominal voltage, a 36 V DC nominal voltage, a 48 V DC nominal voltage, a 60 V DC nominal voltage, a 108 V DC nominal voltage, or a nominal voltage that is greater than 108 V DC. The output voltage of the charger 108 may be suitable for charging of the battery 128 as a whole.

The nominal voltage of the battery 128, however, is greater than a maximum output voltage of the charger 118. For example, the charger 118 may have a maximum output voltage of 22 V DC in the example of the connector 114 and the charger 118 being a universal serial bus (USB)-C type charger and connector. Again, while the example of USB-C type is provided, the present application is also applicable to types of chargers and connectors, such as USB-A connectors, USB-B connectors, USB mini-A connectors, USB mini-B connectors, USB mini-AB connectors, lighting connectors by Apple, Inc, etc.

The battery 128 includes a plurality of individual battery cells 132 that are electrically connected within the battery 128 to produce the nominal voltage at output terminals of the battery 128. The charging module 124 is configured to charge all of the cells 132 simultaneously using power received via the first charge port 102. While the example of the cells 132 will be described herein for ease of discussion, the cells 132 may be battery modules, where each battery module includes multiple battery cells connected in series, parallel, or a combination.

As discussed above, however, the voltage received at the second charge port 112 may be less than the nominal voltage of the battery 128. This may be attributable to the use of the charger 118 from a different device (e.g., a charger of a portable computer) to charge the battery 128. When the voltage received is less than the nominal voltage of the battery 128, as discussed further below, the charging module 124 controls the application of the received voltage to different sets (or groups) of one or more of the cells 132 to individually charge the sets of one or more of the cells 132 using the received voltage. This allows chargers and connectors other than the charger 108 of the vehicle 100 to be used to charge the battery 128. This may enable charging of the battery 128, for example, when the vehicle 100 is parked at a location without the charger 108 but the other (lower voltage) charger 118 is available, such as a portable computer charger) and under other circumstances.

An inverter module 136 includes a plurality of switches. The inverter module 136 may include, for example, a three phase inverter module or another suitable type of inverter. A control module 140 controls switching of the switches of the inverter module 136 to control power flow from the battery 128 (the output terminals) to a motor 144 during vehicle operation. The control module 140 may also control switching of the switches to control power flow from the motor 144 to the battery 128 during vehicle operation, such as during regenerative braking.

The motor 144 outputs (positive) torque to one or more wheels 148 of the vehicle 100 when power is received from the battery 132. The motor 144 may convert mechanical energy into electrical energy and output power to the inverter module 136 when the inverter module 136 is not outputting power to the motor 144.

FIGS. 3A-3C include diagrams of example 12, 24, and 48 nominal voltage batteries with various different cell voltages and examples of how the cells can be electrically connected to achieve the 12, 24, or 48 nominal output voltage. While the examples of 12, 24, and 48 Volts are provided, the present application is also applicable to batteries of other nominal voltages.

Figure 4:
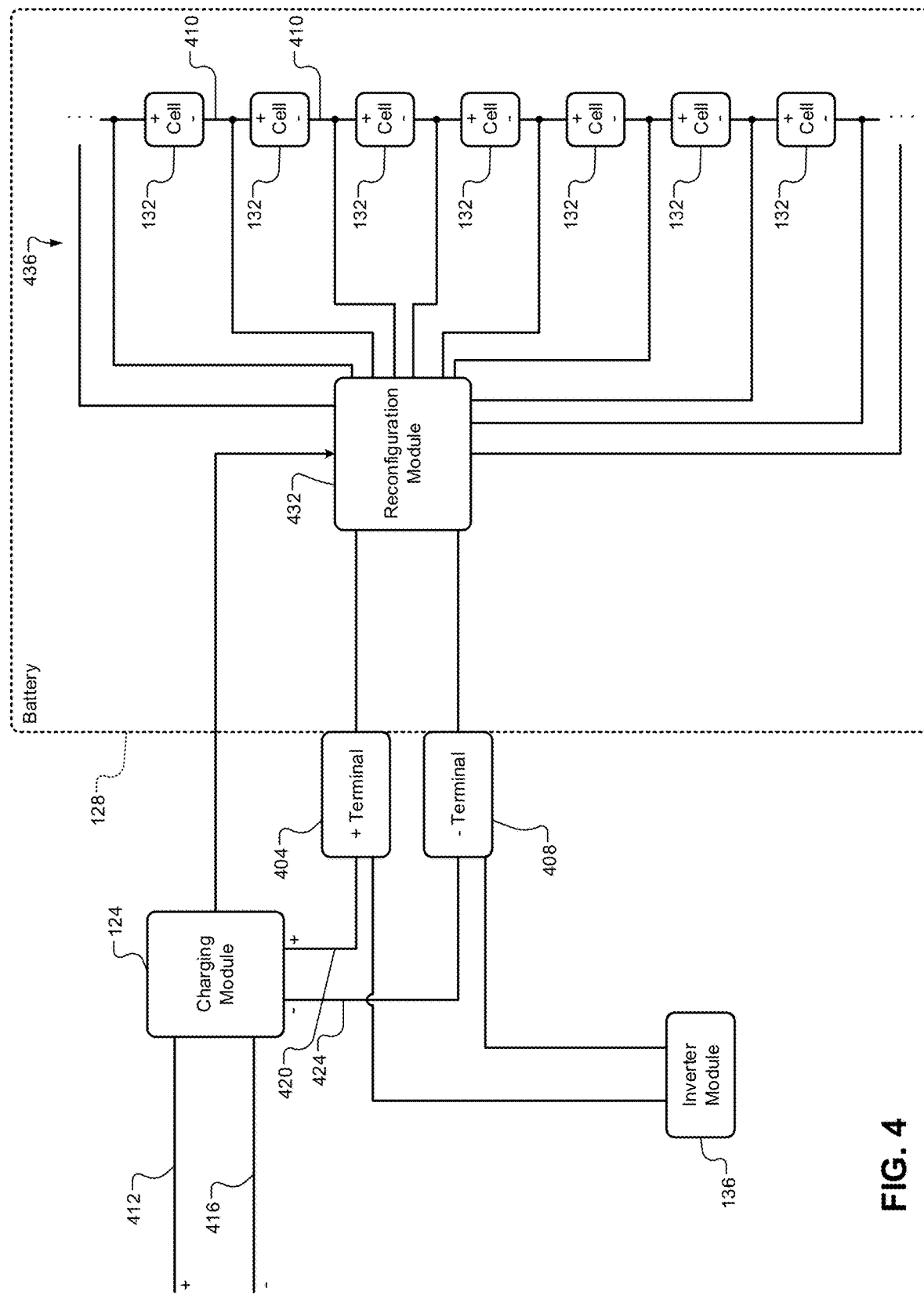

FIG. 4 is a functional block diagram of an example battery charging system. As discussed above, the battery 128 includes multiple of the cells 132 that are electrically connected within the battery 128 to provide the nominal voltage of the battery 128 at output terminals 404 and 408 of the battery 128. Example internal connections are illustrated by 410. While the example of the cells 132 being connected in series (positive to negative) is shown, the cells 132 of the battery 128 may be connected differently. The cells 132 may be connected in series, parallel, or a combination of series and parallel. Also, while seven of the cells 132 are shown in the example of FIG. 4, the battery 128 may include more or less than seven cells.

The first and second charge ports 102 and 112 are connected in parallel (electrically) to positive and negative charging lines 412 and 416. The charging module 124 selectively (electrically) connects the positive and negative charging lines 412 and 416 to positive and negative input lines 420 and 424 for charging of the battery 128. The positive and negative input lines 420 and 424 are connected to the terminals 404 and 408 of the battery 128. The inverter module 136 is also connected to the terminals 404 and 408 in the example of the vehicle 100. In the example of other types of devices, another suitable type of electrical load is connected to the terminals 404 and 408 of the battery 128.

A reconfiguration module 432 is also connected to the terminals 404 and 408. The reconfiguration module 432 is configured to electrically connect (i) individual ones of the cells 132 to the terminals 404 and 408 for charging of the cells 132 individually, (ii) groups of two or more of the cells 132 to the terminals 404 and 408 for charging of the groups individually, and (iii) all of the cells 132 to the terminals 404 for charging of all of the cells 132 simultaneously. The reconfiguration module 432 connects to less than all of the cells 132 (e.g., groups or individual cells) via internal wiring generally illustrated by 436. The reconfiguration module 432 may include, for example, a multiplexer or another suitable type of device that is configured to electrically connect to electrically connect as discussed above.

Figure 5:
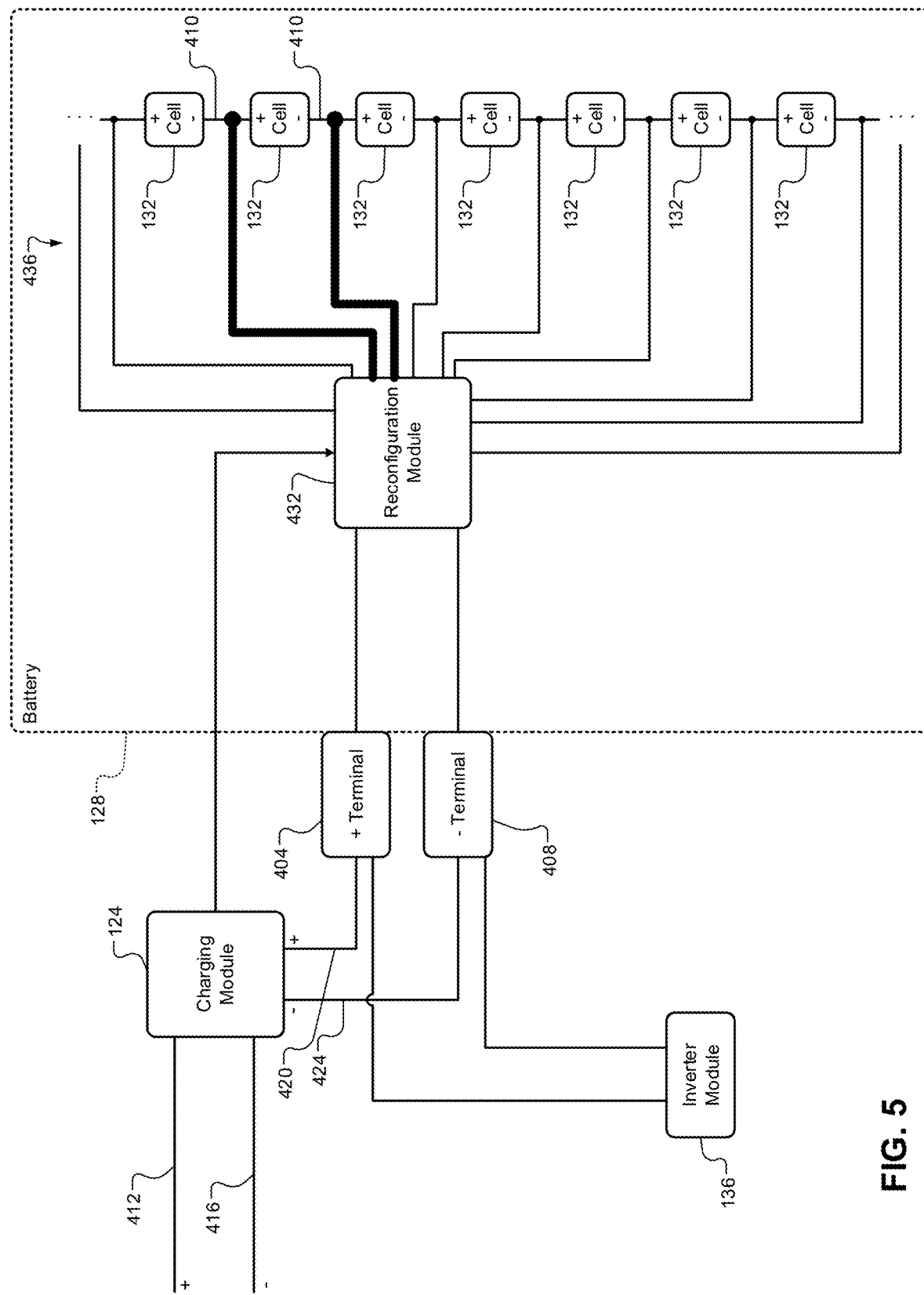
Figure 6:
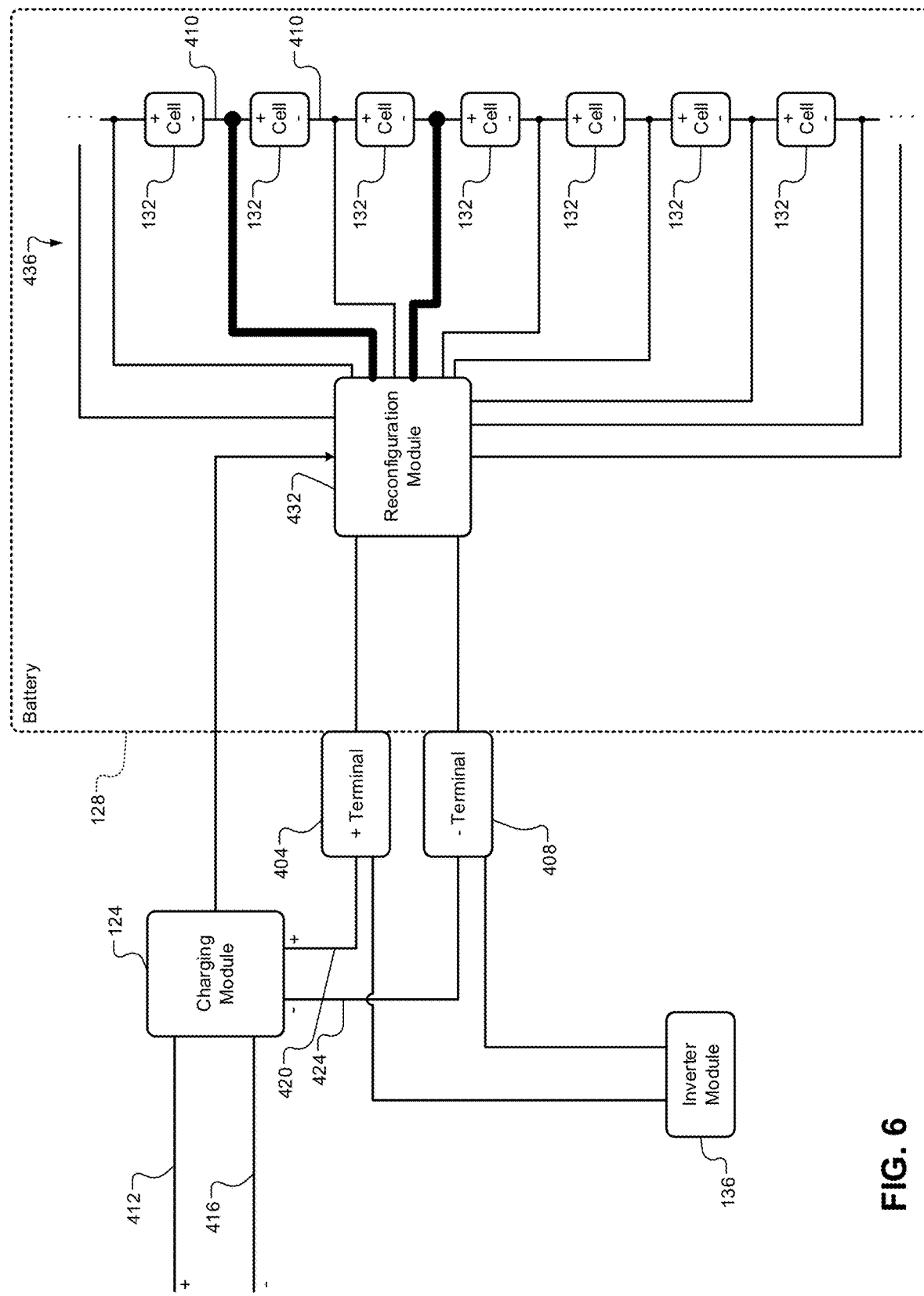
Figure 7:
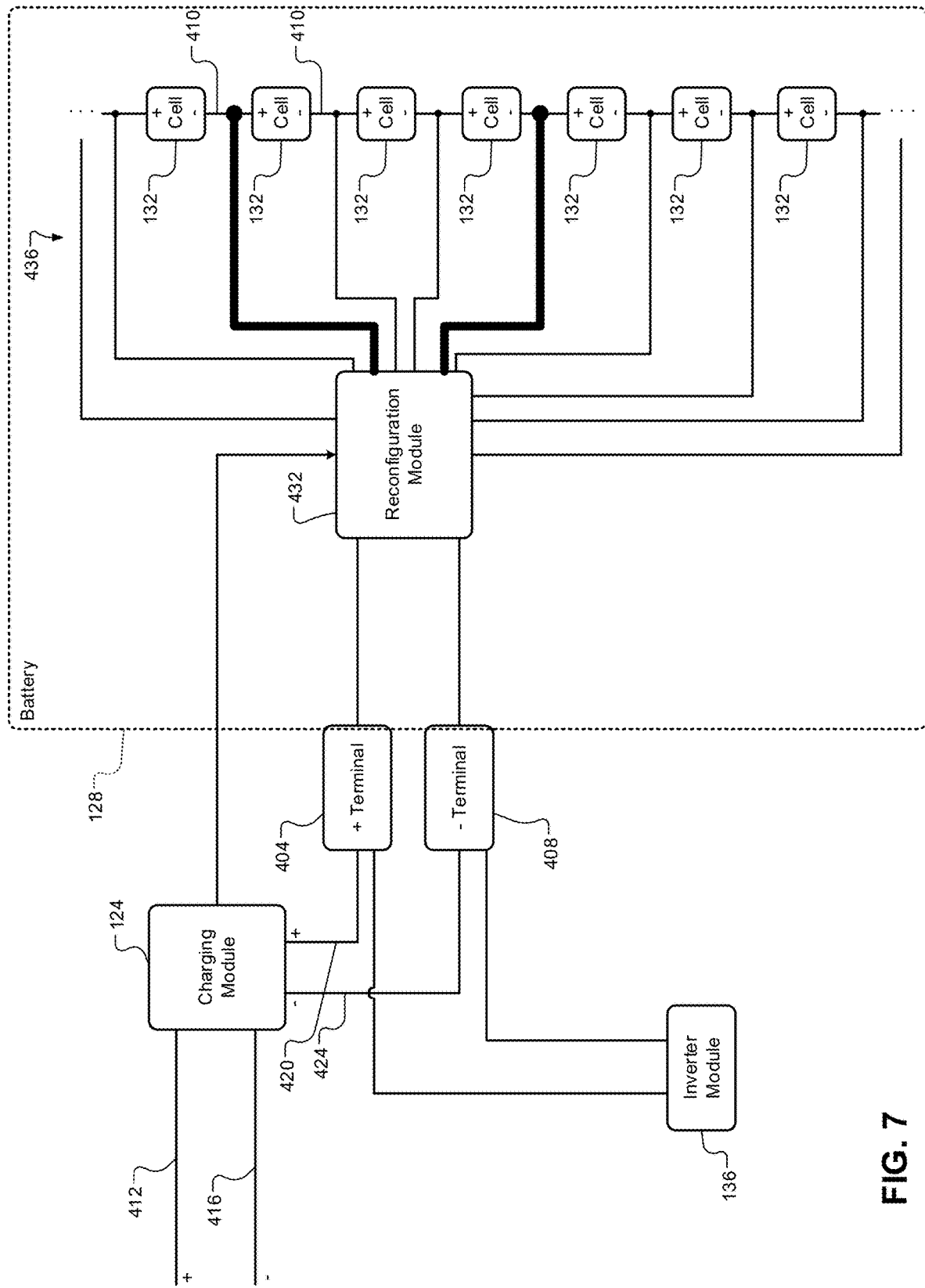
Figure 8:
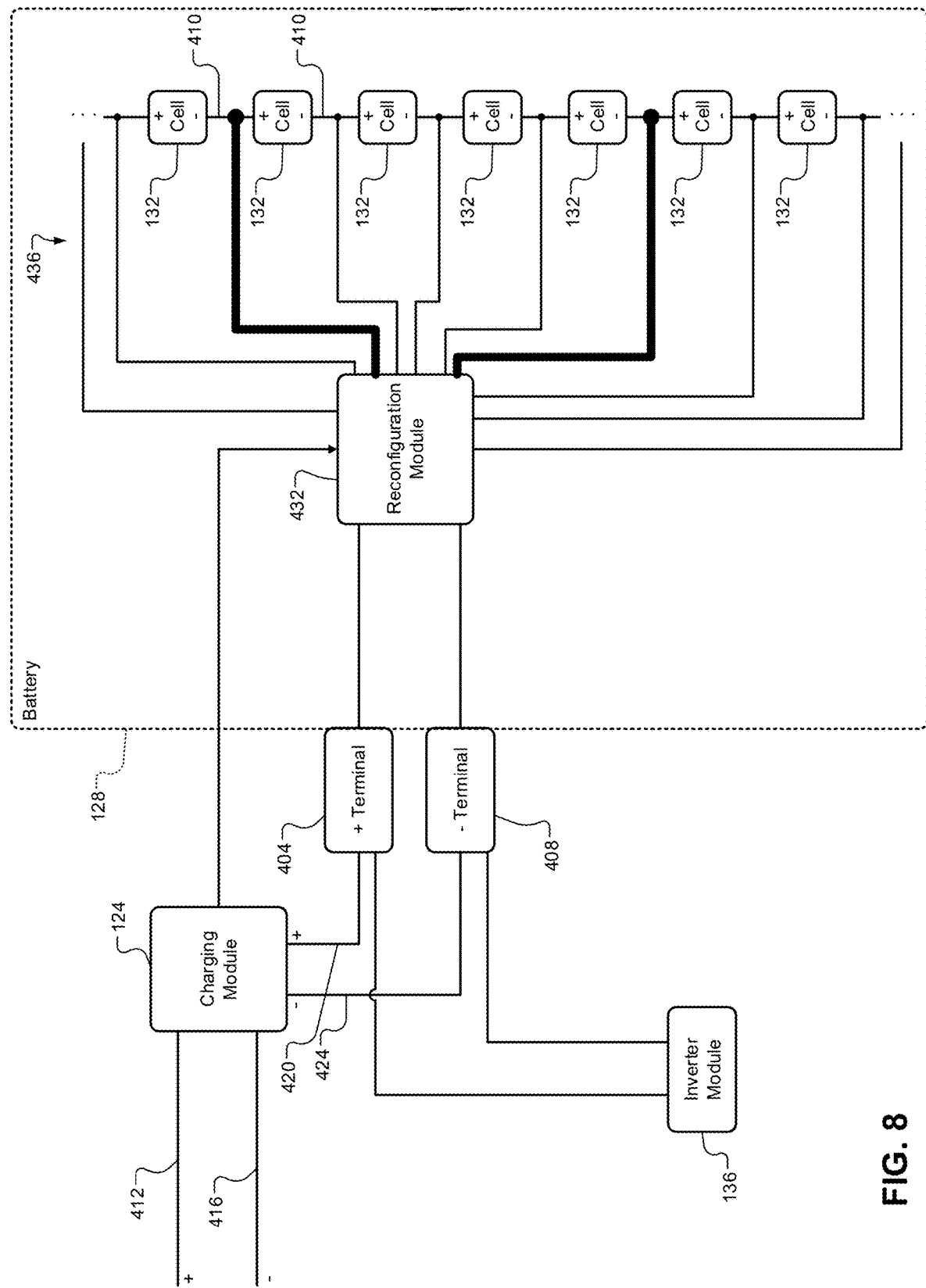

FIG. 5 is an example illustration of the reconfiguration module 432 connecting the terminals 404 and 408 to one of the cells 132 to charge that one of the cells 132 individually via the internal wiring 436. FIG. 6 is an example illustration of the reconfiguration module 432 connecting the terminals 404 and 408 to a group of two of the cells 132 to individually charge that group of two of the cells 132 via the internal wiring 436. FIG. 7 is an example illustration of the reconfiguration module 432 connecting the terminals 404 and 408 to a group of three of the cells 132 to individually charge that group of three of the cells 132 via the internal wiring 436. FIG. 8 is an example illustration of the reconfiguration module 432 connecting the terminals 404 and 408 to a group of four of the cells 132 to individually charge that group of four of the cells 132 via the internal wiring 436. While other numbers of cells are not shown, the reconfiguration module 432 can also connect the terminals 404 and 408 to groups of greater numbers of cells or all of the cells 132.

The charging module 124 measures a voltage across the positive and negative lines 412 and 416 or 420 and 424. The charging module 124 determines how many of the cells 132 to charge and actuates the reconfiguration module 432 based on the measured voltage. For example, when the measured voltage is greater than or equal to the nominal voltage of the battery 128, the charging module 124 may actuate the reconfiguration module 432 such that all of the cells 132 are connected to the terminals 404 and 408 for simultaneous charging of all of the cells 132.

When the measured voltage is less than the nominal voltage of the battery 128, the charging module 124 may actuate the reconfiguration module 432 such that less than all of the cells 132 are connected to the terminals 404 and 408. The charging module 124 may determine the number of the cells 132 to connect based on the measured voltage and nominal voltages of the cells 132. Each of the cells 132 may have the same nominal voltage, such as 1-6 volts DC. The charging module 124 may determine the number of cells 132 to connect to the terminals 404 and 408 for charging at a given time using one or more equations and/or lookup tables that relate measured (input) voltages to numbers of cells to charge.

For example, the charging module 124 may determine the number of the cells 132 to connect to the terminals 404 and 408 based on the measured voltage divided by the nominal voltage of the cells 132. As an example, if the measured voltage is 12 volts and the nominal voltage of the cells 132 is 1.2 volts, the charging module 124 may actuate the reconfiguration module 432 to connect groups of ten of the cells 132 (12 volts/1.2 volts=10) for charging in groups of ten of the cells 132. If the determination results in a fractional number of cells, the charging module 124 may round the resulting number down to the nearest integer. For example, if the measured voltage is 12 volts and the nominal voltage of the cells is 5 volts (12/5=2.4 cells), the charging module 124 may actuate the reconfiguration module 432 to connect groups of 2 of the cells 132 to the terminals 404 and 408 for charging in groups of two cells. The charging module 124 may actuate the reconfiguration module 432 to connect the cells 132 individually when the number determined is less than 2 and greater than or equal to 1. When the determined number is less than 1, the charging module 124 may actuate the reconfiguration module 432 such that no charging is performed.

When charging less than all of the cells 132 at a given time (e.g., groups of two or more cells or individual cells), the charging module 124 may actuate the reconfiguration module 432 to change which one or more of the cells 132 are being charged for charge balancing. For example, the charging module 124 may charge each cell or group of two or more cells for a predetermined period (e.g., 1 second to 5 minutes) before actuating the reconfiguration module 432 to charge a different cell or group of two or more cells for the predetermined period. In this example, the charging module 124 may charge each cell or group of two or more cells before charging a cell or a group of two or more cells a second time. This may balance charging of the cells 132 and may be referred to as cycling. The charging module 124 stops charging of the battery 128 once charging is complete, such as once the voltage at the terminals 404 and 408 reaches a predetermined voltage, such as approximately the nominal voltage of the battery 128.

FIG. 9 includes an example graph illustrating cycling charging of 3 different groups of cells (Group 1, Group 2, and Group 3). In FIG. 9, each group is charged for a predetermined period (represented by a pulse) before the process is repeated.

As shown in FIG. 1, one or more mechanisms 160 may be implemented for warning or preventing stoppage of charging, such as when the cells are not well balanced. For example, the charging module 124 may lock a locking mechanism and physically prevent disconnection of the connector 114 when stopping of charging may damage the battery 128. Additionally or alternatively, the charging module 124 may illuminate one or more light emitting devices (e.g., light emitting diodes (LEDs)) to indicate whether disconnection of the connector 114 may damage the battery 128. For example, the charging module 124 may visually output a first color via a light emitting device when disconnection of the connector 114 is acceptable and visually output a second color via a light emitting device when disconnection of the connector 114 may damage the battery 128. Additionally or alternatively, the charging module 124 may activate a sound generating device (e.g., a vibrating device) when disconnection of the connector 114 may damage the battery 128. The mechanism(s) 160 may help prevent disconnection of the connector 114 (and stoppage of charging) at times when the battery 128 may be damaged.

FIG. 10 is a functional block diagram of an example implementation of the battery 128. As shown, the battery 128 may also include an expansion port 1004. The expansion port 1004 may allow for a pack of one or more external battery cells to be connected to the battery 128.

FIG. 11 is a functional block diagram of an example implementation of the battery 128. The terminals 404 and 408 may be used as higher voltage power source connection terminals. The battery 128 may also include an additional terminal 1104. The additional terminal 1104 may be configured to receive a lower voltage from a lower voltage power source together, for example, with the terminal 408.

A communication module 1108 may be connected to the additional terminal 1104. The communication module 1108 communicates with the charging module 124, such as using serial communication.

The charging module 124 actuates switches of the reconfiguration module 432 to control charging of the cells 132 individually or in groups of two or more. Use of power received at the additional terminal 1104 may be used to provide low voltage, high current charging. In this example, the reconfiguration module 432 includes transformers (e.g., one per cell) and sets of switches (e.g., one set per cell) to provide higher charging current to the cells 132 individually or in groups of two or more. The charging module 124 may control the reconfiguration module 432 for cell balancing, thermal management, current management, overcharge protection, etc.

In a feature, a battery charging system of an electronic device includes: a battery having a first nominal voltage and including: battery cells each having a second nominal voltage that is less than the first nominal voltage; and electrical connectors that electrically connect ones of the battery cells to provide the battery with the first nominal voltage; a first charge port configured to electrically connect to a first type of connector; a charging module configured to: receive power via the first charge port; and when a voltage of the received power is less than the first nominal voltage at least one of: charge ones of the battery cells individually; and charge groups of two or more of the battery cells.

In further features, the charging module is configured to, when the voltage of the received power is less than the first nominal voltage, determine a number of the battery cells to charge at a time based on the voltage and the second nominal voltage.

In further features, the charging module is configured to set the number based on the voltage divided by the second nominal voltage.

In further features, the charging module is configured to round the number down to a nearest integer when the number is a non-integer.

In further features, the charging module is further configured to when the voltage is greater than or equal to the first nominal voltage, charge all of the battery cells concurrently.

In further features, a reconfiguration module has outputs connected to the battery cells individually, wherein the charging module is configured to actuate the reconfiguration module to charge the battery cells.

In further features, a reconfiguration module includes: a transformer per battery cell and a pair of switches per battery cell configured output power to at least one of: ones of the battery cells individually; and groups of two or more of the battery cells.

In further features, the first type of connector satisfies a universal serial bus (USB) standard.

In further features, a second charge port is configured to electrically connect to a second type of connector, where the charging module is further configured to receive power via the second charge port, and where the second type of connector does not satisfy any universal serial bus (USB) standard.

In further features: the first type of connector has a first maximum voltage; the second type of connector has a second maximum voltage; and the second maximum voltage is greater than the first maximum voltage.

In further features: a charger has a plug end configured to receive power via a wall outlet; and a charge cable is connected at a first end to the charger and connected at a second end to the second type of connector.

In further features: a charger has a plug end configured to receive power via a wall outlet; and a charge cable is connected at a first end to the charger and connected at a second end to a third type of connector that is different than the second type of connector; and an adaptor has a first end configured to electrically connect to the third type of connector and a second end having the second type of connector.

In further features, the vehicle is one of an electric bicycle and an electric scooter.

In a feature, a battery charging method for a vehicle includes: receiving power from (i) a first charge port configured to electrically connect to a first type of connector and (ii) a second charge port configured to electrically connect to a second type of connector that is different than the first type of connector; and when a voltage of the received power is less than a first nominal voltage of a battery one of: charging ones of battery cells of the battery individually; and charging groups of two or more of the battery cells of the battery, where the battery includes: the battery cells and the battery cells have a second nominal voltage that is less than the first nominal voltage; and electrical connectors that electrically connect ones of the battery cells to provide the battery with the first nominal voltage.

In further features, the battery charging method further includes: determining a number of the battery cells to charge at a time based on the voltage and the second nominal voltage; and when the voltage of the received power is less than the first nominal voltage of the battery, charging the determined number of the battery cells at a time.

In further features, the determining includes setting the number based on the voltage divided by the second nominal voltage.

In further features, the setting includes rounding the number down to a nearest integer when the number is a non-integer.

In further features, the battery charging method further includes, when the voltage is greater than or equal to the first nominal voltage, charging all of the battery cells concurrently.

In further features, the second type of connector satisfies a universal serial bus (USB) standard.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

In this application, including the definitions below, the terms "module" and "system" may refer to, be part of, or include circuits or circuitry that may include processor hardware (shared, dedicated, or group) that executes code and memory hardware (shared, dedicated, or group) that stores code executed by the processor hardware. The code is configured to provide the features of the modules and systems described herein. In addition, in this application the terms "module" and "system" may be replaced with the term "circuit." The term "memory hardware" may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as JavaScript Object Notation (JSON), hypertext markup language (HTML) or extensible markup language (XML); (ii) assembly code; (iii) object code generated from source code by a compiler; (iv) source code for execution by an interpreter; (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A battery charging system of an electronic device, comprising:
    a battery having a first nominal voltage and including:
        battery cells each having a second nominal voltage that is less than the first nominal voltage; and
        electrical connectors that electrically connect ones of the battery cells to provide the battery with the first nominal voltage;
    a first charge port configured to electrically connect to a first type of connector, wherein the first type of connector satisfies a universal serial bus (USB) standard;
    a second charge port, configured to electrically connect to a second type of connector,
    wherein the second type of connector does not satisfy any universal serial bus (USB) standard; and
    a charging module configured to:
        receive power via the first charge port and the second charge port; and
        when a voltage of the received power from the first charge port is less than the first nominal voltage at least one of:
            charge ones of the battery cells individually; and
            charge groups of two or more of the battery cells.

2. The battery charging system of claim 1 wherein the charging module is configured to, when the voltage of the received power is less than the first nominal voltage, determine a number of the battery cells to charge at a time based on the voltage of the received power and the second nominal voltage.

3. The battery charging system of claim 2 wherein the charging module is configured to set the number based on the voltage of the received power divided by the second nominal voltage.

4. The battery charging system of claim 3 wherein the charging module is configured to round the number down to a nearest integer when the number is a non-integer.

5. The battery charging system of claim 1 wherein the charging module is further configured to when the voltage of the received power is greater than or equal to the first nominal voltage, charge all of the battery cells concurrently.

6. The battery charging system of claim 1 further comprising a reconfiguration module having outputs connected to the battery cells individually,
    wherein the charging module is configured to actuate the reconfiguration module to charge the battery cells.

7. The battery charging system of claim 1 further comprising a reconfiguration module includes:
    a transformer per battery cell and a pair of switches per battery cell configured output power to at least one of:
        ones of the battery cells individually; and
        groups of two or more of the battery cells.

8. The battery charging system of claim 1 wherein:
    the first type of connector has a first maximum voltage;
    the second type of connector has a second maximum voltage; and the second maximum voltage is greater than the first maximum voltage.

9. The battery charging system of claim 1 further comprising:
   a charger having a plug end configured to receive power via a wall outlet; and
   a charge cable connected at a first end to the charger and connected at a second end to the second type of connector.

10. The battery charging system of claim 1 further comprising:
   a charger having a plug end configured to receive power via a wall outlet; and
   a charge cable connected at a first end to the charger and connected at a second end to a third type of connector that is different than the second type of connector; and
   an adaptor having a first end configured to electrically connect to the third type of connector and a second end having the second type of connector.

11. The battery charging system of claim 1 wherein the electronic device is one of an electric bicycle and an electric scooter.

12. A battery charging method for a vehicle, comprising:
   receiving power from (i) a first charge port configured to electrically connect to a first type of connector and (ii) a second charge port configured to electrically connect to a second type of connector that is different than the first type of connector,
   wherein the first type of connector satisfies a universal serial bus (USB) standard, and
   wherein the second type of connector does not satisfy any universal serial bus (USB) standard; and
   when a voltage of the received power from the first charge port is less than a first nominal voltage of a battery one of:
      charging ones of battery cells of the battery individually; and
      charging groups of two or more of the battery cells of the battery,
   wherein the battery includes:
      the battery cells and the battery cells have a second nominal voltage that is less than the first nominal voltage; and
      electrical connectors that electrically connect ones of the battery cells to provide the battery with the first nominal voltage.

13. The battery charging method of claim 12 further comprising:
   determining a number of the battery cells to charge at a time based on the voltage of the received power and the second nominal voltage; and
   when the voltage of the received power is less than the first nominal voltage of the battery, charging the determined number of the battery cells at a time.

14. The battery charging method of claim 13, wherein the determining includes setting the number based on the voltage of the received power divided by the second nominal voltage.

15. The battery charging method of claim 14 wherein the setting includes rounding the number down to a nearest integer when the number is a non-integer.

16. The battery charging method of claim 12 further comprising, when the voltage of the received power is greater than or equal to the first nominal voltage, charging all of the battery cells concurrently.

* * * * *